United States Patent Office 3,189,436
Patented June 15, 1965

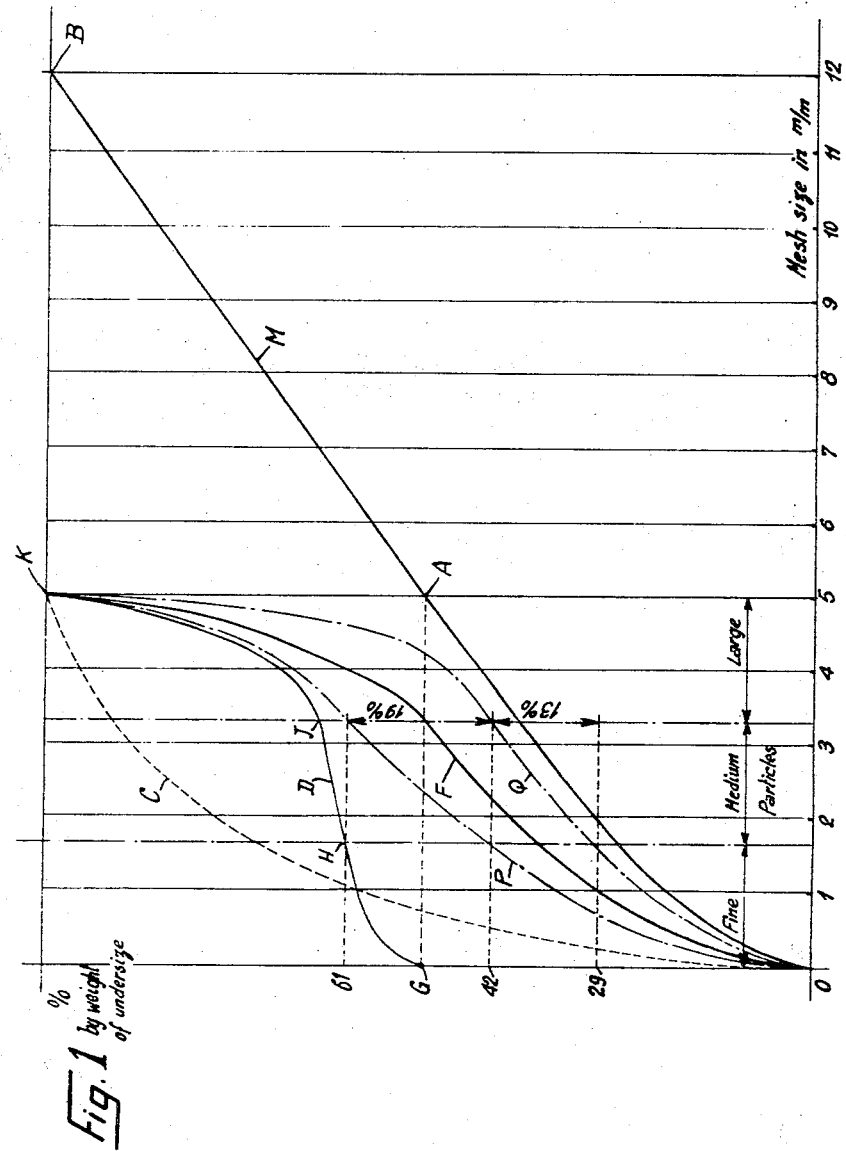

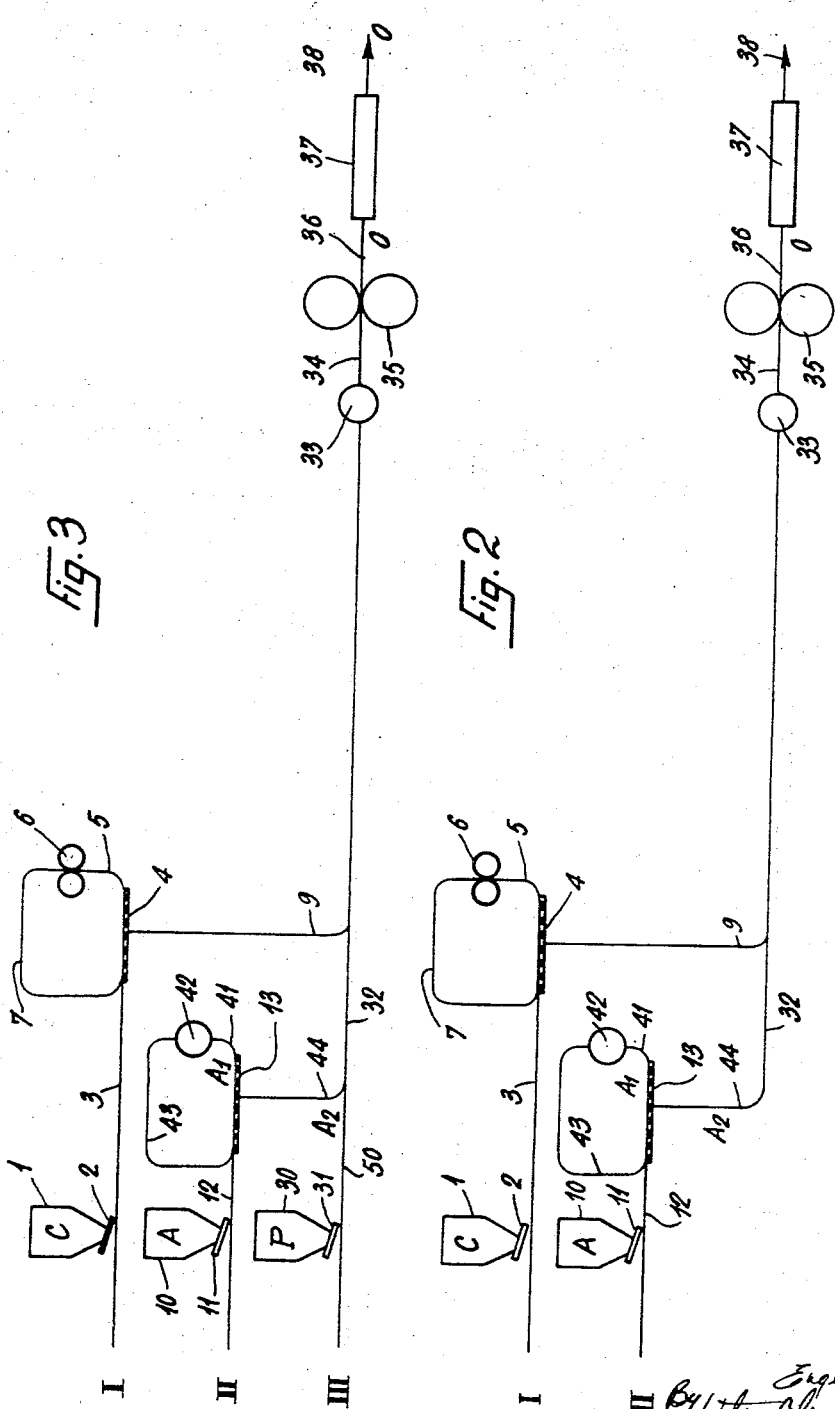

3,189,436
PROCESS FOR THE AGGLOMERATION OF PULVERULENT METALLIFEROUS MATERIALS
Eugene M. Burstlein, 7 Rue Basse de la Terrasse, Meudon-Bellevue, Seine-et-Oise, France
Filed Apr. 23, 1962, Ser. No. 189,635
Claims priority, application France, Mar. 3, 1959, 788,416, Patent 1,228,176
7 Claims. (Cl. 75—5)

This is a continuation-in-part of my U.S. application Serial Number 9,874 filed February 19, 1960, and now abandoned.

Processes are already known for sintering pulverulent metalliferous materials, i.e. ores or compounds containing metals in the non-metallic state such as iron ores, converter or blast-furnace dusts, fines issuing from sintering plants etc. In these processes, the pulverulent materials, whatever their nature, are brought to a temperature slightly above their softening point, e.g. about 1000° C. either by means of a gaseous fuel such as blast-furnace gas, or by means of a liquid fuel such as petroleum oils, or by means of a solid pulverulent fuel such as coke dust or fine coal.

Thus, at the output of the sintering plants a partially agglomerated product is obtained which is subjected to a sizing separation on a mesh screen of about 7 mm. The oversize from this separation is used in a smelting process, for instance in a blast furnace, while the insufficiently sintered pulverulent screenings are re-cycled into the sintering plant, hence the name "returned fines" which is given to these screenings.

These known sintering processes have two capital drawbacks:

(1) They lead to considerable initial expenses since the equipment necessary for carrying out these processes is very cumbersome and expensive; and (2) they lead to very high manufacturing costs since all the pulverulent material to be agglomerated, and the returned fines which often may be as high as 50% by weight of this material, must be heated to about 1000° C. requiring a heat consumption of about 500,000 calories per ton of sintered product.

In view of these drawbacks, inherent to the known sintering processes, many attempts have been made hitherto to consolidate pulverulent metalliferous materials simply by briquetting under pressures of about 50, 100 or even 150 kg./cm.$^2$, but all these attempts have failed for one or more of the following reasons:

(1) the briquettes obtained had too low mechanical strength and compactness for supporting efficiently the considerable crushing and abrasive actions to which they are subjected in the shaft furnaces, (2) the briquettes had insufficient fire resistance, and shattered and returned to the dust state in the shaft furnaces by the action of the thermal shock and release of water and gas due to decomposition of the hydrates and carbonates, and reduction of the oxides, and/or (3) the briquettes had insufficient porosity to allow a full and rapid direct or indirect reduction of the metalliferous materials in shaft furnaces.

To sum up, the technical failure of known briquetting attempts is due to the fact that it seems to be impossible to satisfy simultaneously the two following entirely conflicting conditions, namely:

To make agglomerates which are simultaneously very compact for resisting on the one hand, the considerable stresses to which they are subjected in a shaft furnace and, on the other hand, are porous enough to let the considerable volumes of gas generated by the decomposition or the reduction of the hydrates, carbonates or oxides to escape from the briquettes, without shattering or spalling thereof and returning to the dust state.

With the above considerations in view, the main object of this invention is a process for obtaining briquettes or agglomerates essentially consisting of metalliferous materials having a strength and compactness sufficient to withstand the high stresses to which they are subjected in a shaft furnace.

Another object of this invention is to provide briquettes or agglomerates, consisting of metalliferous materials for the major portion and of a solid reducing agent for a minor portion, having a high mechanical strength, an elevated fire resistance, and well adapted for reduction and smelting in a shaft furnace.

Another important object of this invention is to provide such briquettes or agglomerates which are very compact and acquire, during their descent through a shaft furnace, a porosity permitting the escape of the gases produced by the decomposition or reduction of the metalliferous materials without seriously impairing the mechanical strength of the briquettes to crushing.

Still another object of this invention is to provide briquettes or agglomerates as set forth herein above, obtained only by operations made in the cold state.

Another object of this invention is to provide briquettes or agglomerates of metalliferous materials to be reduced and smelted in a shaft furnace having a relatively small volume for reducing the hazards of shattering or spalling of the briquettes.

Another object of the invention is to provide agglomerates of metalliferous materials having preferably an ovoid form and a volume not in excess of about 40 cc. for further enhancing their mechanical strength and fire resistance during their descent through a shaft furnace.

Still another object of this invention is to provide small compact agglomerates of metalliferous materials which are further hardened by exposure in an atmosphere of air or flue gases at a temperature ranging between about 0° and 100° C.

Another object of this invention is to provide a process for making compact agglomerates of a relatively small volume consisting of metalliferous materials for the major proportion and of a solid reducing agent for a minor proportion, wherein said metalliferous materials may be raw materials such as ores, or materials having already been heated or roasted, or both.

Another further object of this invention is to provide a combined sintering-agglomerating process wherein the raw metalliferous materials are first subjected to a sintering operation and the portions of the sintered product consisting of particles having a size too low for being charged directly into a shaft-furnace (return fines) are subjected to an agglomerating operation by compression in the cold state, for obtaining compact ovoid agglomerates of a relatively small volume, thereby considerably increasing the output of the sintering operation and reducing the fuel consumption necessary for compacting the whole metalliferous materials.

The novel process for agglomerating metalliferous pulverulent materials makes it possible to obtain by means of operations made in the cold state, from pulverulent metalliferous materials, agglomerates having very high mechanical strength, which do not spall when subjected to fire, and are easily reduced. The novel process also makes it possible, when used in combination with a sintering process of metalliferous materials known per se, to reduce by about 70% the cost price of the consolidated material obtained in sintering plants, including the depreciation rate of said plants.

This novel process for agglomerating highly pulverulent metalliferous materials, for the purpose of their reduction and smelting in a shaft furnace, makes it possible to satisfy the conflicting conditions referred to above of obtaining a great compactness and high mechanical strength together with a high porosity. This is obtained by mixing the metalliferous materials with a solid reducing agent, such as coke or lean coal in small particles, in an amount just sufficient to given to the agglomerates obtained by compression of the mixture, as they are heated in the shaft furnace, the necessary degree of porosity provided by the gradual modification of their structure due to the chemical reactions, performed therein from the periphery towards the center, between the carbon element of the reducing agent and the oxygen present in the metalliferous materials or in the environment thereof. This modification of the structure of the agglomerates is obtained without impairing their strength, by giving to the particles of the reducing agent on the one hand, and to the particles of the metalliferous materials on the other hand a well defined size distribution capable of maintaining in the porous structure taken by the agglomerates during their descent through the shaft furnace a mechanical strength sufficient to support the high stresses to which they are subjected.

As a result of my tests I have found that the particle size distribution in the mixture is of prime importance for the agglomeration of pulverulent metalliferous materials into a compact product useful for reduction and smelting in a shaft furnace. In fact, it is necessary for the quantity of fine and very fine particles not to be too large. To have the maximum packing density, it is necessary to use a mixture in which the larger particles are in contact with one another and containing just the sufficient proportion of fine and very fine particles to fill up the spaces between the large particles in contact. Such a mixture has a particle size distribution whose representative diagram has a very particular aspect.

The particle size distribution of a granulated material may be represented by a curve or diagram obtained by plotting as ordinates the cumulated percentages by weight of the undersizes provided by successive screening operations effected on said material with progressively increasing mesh sizes, in terms of the meshes of the screens. Such curve or diagram may assume different forms according to the relative proportions, in the material, of the coarse, medium and fine particles. Generally in the natural pulverulent materials, or in the products obtained from the usual grinding processes, the particle size distribution diagram is more or less similar to a semi-parabolic curve, by reason of the presence in the materials of a high proportion of very fine particles or dust. However, it is possible to modify the size distribution diagram of such materials by suitable means.

Generally when the medium particle size of the material is simultaneously to be lowered, this is obtained by grinding the material below the upper limit of the new granulometric area, screening the ground material on screens provided with conveniently choosen meshes for obtaining several fractions, and discarding a portion, or the whole, of one or several fractions, and blending thereafter the remainder.

I have now found, that it is possible to modify the particle size distribution of a pulverulent metalliferous material, when the medium particle size of said material is to be reduced, in such a manner as to obtain a ground material capable of being agglomerated in compact products having high mechanical strength and fire resistance, without discarding any portion of said material. This can be made by subjecting these materials to a progressive and controlled grinding operation with recycling of the oversize obtained on a screen equipped with a predetermined mesh. By "progressive and controlled grinding operation" is meant that the material is processed in a grinder or crusher, of any known type, associated with a control screen, the material being separated on said screen into oversize particles above the size range controlled by the mesh of said screen, and undersize particles below said size range, said oversize particles being subjected to a crushing operation in said grinder or crusher running at a low crushing rate, the material issuing from said grinder being fed to the control screen and the oversize particles of the said screening operation being recycled to the crusher to be subjected to other crushing operations as often as is necessary to reduce them to undersize particles.

In this specification and the appended claims, by "low crushing rate" is meant that the grinder, crusher or crushing zone is so operated that in the product issuing therefrom, only 25 to 80%, and preferably from 30 to 60% of said product, on a weight basis has been reduced, during one crushing cycle, to a fineness sufficient for its particles to pass through the mesh of the control screen.

Thus, it is possible, by a convenient selection of the crushing rate and of the control mesh, to provide a particle size distribution diagram of a pulverulent material, with the curve having approximately the form of an inverted elongated S, i.e. a curve comprising a relatively low slanting mid-portion joining two much more slanting portions merging on each side with said mid-portion.

If the particles of a pulverulent material processed according to the above described method for providing a particle size distribution diagram having a curve resembling an inverted elongated S, are classified into three adjacent fractions each extending over one-third of the total particle size distribution range of said material and respectively containing what shall be said the fine, medium and large particles, the percentages by weight of the material constituting said fractions should preferably be within the following limits: 29 to 42% for the fine fraction, 13 to 19% for the medium fraction and 39 to 58% for the large particles fraction.

In this specification and the appendant claims "constant particle size distribution" means that the particle size distribution diagram of the fraction to which said expression applies, always has the same general appearance, the proportions of the different particle sizes varying between very close limits, and the full size distribution range of said fraction always being the same.

Further and more specifically I have found that particularly good results are obtained when the larger particles of the ground metalliferous materials have a size not in excess of 5 mm., and the solid reducing agent used in the mixture is more finely ground, the larger particles therein having at most a size of 3 mm. and preferably lower. Thus the preferred total particle size distribution range is up to 5 mm. for the metalliferous material and up to 3 mm. for the reducing agent. Moreover a porosity sufficient for allowing the escape of the gases generated within the agglomerates and the full reduction of the metallic components therein, is obtained during their descent through the shaft-furnace, without impairing the mechanical strength and fire resistance of said agglomerates, when the solid reducing agent is present in the mixture in a proportion not exceeding 12% and preferably of at least 2% of the total weight of said mixture.

Metalliferous materials are rarely homogeneous and therefore comprise constituents of different hardness. If they are crushed in a single operation, as is generally done, it is necessary, for crushing the harder constituents below the selected particle size, to effect much too great a reduction in the grain size of the less hard constituents, which are therefore overcrushed and provide an excess of fine dust. The progressive, controlled crushing with recycling described herein above, eliminates this disadvantage and also makes it possible to send to the crusher only a part of the material which is to be processed. In fact by first passing the raw material over a screen, the portion of this material which has already the desired fineness (sometimes a very considerable portion up to 50% of the total mass) is not subjected to the crushing step. Furthermore, the crushers, which can be of any conventional type, are adjusted so as to have only a fairly low crushing rate (25 to 80%) which does not prejudice the more friable constituents which, at the outlet of the crushers, are immediately separated through a screen, i.e. as soon as they have reached the desired fineness, and are thus prevented from being pulverized into fine dust, the oversize from this screening operation being re-cycled to the crushers. In this way, the friable constituents are not over-crushed, while the hard constituents are re-cycled into the crusher as often as is necessary to reduce them to the desired particle size. Thus the whole material may be given a particle size below a predetermined value, while obtaining in the crushed product a relatively high proportion of large grains consisting of the harder constituents of the material, which are more particularly able to resist when in contact with one another in the agglomerates, the high loads to which said agglomerates are subjected in the furnace.

Another important factor for obtaining agglomerates which resist mechanical and thermal stresses in shaft furnaces is the size and form of the agglomerates produced. In the past, attempts at agglomeration of metalliferous materials were intended to produce briquettes of relatively large volume, of about 500 cm.$^3$ for example, more particularly in order to reduce the manufacturing cost. According to the invention, there are only prepared relatively small compressed agglomerated products having a volume from 20 to 40 cc. and preferably the shape of flattened ellipsoids. This makes it possible to obtain in the agglomerating process much more even pressure which is easily transmitted throughout the entire mass and reduces the risks of the compressed products cracking both when they are being processed and when they are conveyed, and also when they are subjected to the effects of mechanical and thermal stresses in the shaft furnace.

Before compressing the mixtures of metalliferous pulverulent material and fine coke or coal, the moisture content of said mixture is adjusted to a convenient value, generally within the range of about 7 to 16% by weight of the moistened mixture.

Moisture is necessary, on the one hand, to plastify the mixture and promote its agglomeration and, on the other hand, to permit chemical reactions to take place between constituents themselves and between constituents and some atmospheric agents such as $CO_2$. The percentage of moisture in the mixture depends on the nature of the materials being agglomerated, with materials containing raw clay-like substances requiring less water for good agglomeration than those which do not contain such substances or which have already been subjected to heating at high temperature. This percentage can easily be determined in each case by preliminary tests.

It is known that in order to obtain a well melted slag in a shaft furnace, it is necessary to have proper ratio between the basic constituents and the acid constituents in the charge which is expressed as their molecular equivalents of $CaO$ and $SiO_2$ respectively. The ratio of $CaO/SiO_2$ must be within the range of 1 to 1.4. When the basicity or the acidity of the metalliferous materials dealt with is such that said ratio is not within said range it is possible, for obtaining self-fluxing briquettes or agglomerates, to correct the excess of acidity or basicity so as to obtain for said ratio a value within said range, by an addition to the mixture of 1 to 3% approximately of a basic component in fine powder (lime, dolomite, etc.) or of strong mineral acid (hydrochloric, sulfuric, etc.) without impairing the strength of the agglomerates. The mechanical strength and fire resistance of the agglomerates is not reduced by such additions, and in many cases it is even enhanced. When the metalliferous materials are too basic, the use of sulfuric acid is particularly preferred because said acid is generally available in steel-works, as waste liquors issuing from the pickling plant of iron sheets.

The process according to the invention can be carried into effect by using the following operating methods, which can be combined in various possible ways:

(a) before crushing the raw metalliferous materials, they are subjected to a dust-removing operation on a screen equipped with a mesh ranging between 1 and 5 mm.; the oversize of this operation is subjected to the controlled progressive crushing operation with re-cycling defined herein above so as to bring the largest particles to a particle size at the most equal to the mesh size; the crushed product is mixed with the screenings of the dust-removing operation, the crushing rate of the crusher used being adjusted to obtain a particle size distribution of the mixture having a diagram in the form of an inverted elongated S, and agglomeration is carried out under a high pressure of at least 250 kg./cm.$^2$ after the addition of the solid reducing agent and after wetting the mixture, this reduces the tonnage of materials to be treated by crushing, and at the same time avoids reducing to fine dust the portion of the raw materials whose particle sizes are within the desired limits;

(b) the metalliferous materials are subjected to a dust-removing operation on a screen equipped with a mesh ranging between about 1 and 5 mm. to obtain an oversize $A_1$ and a fine fraction $A_2$, the oversize $A_1$ is subjected to progressive and controlled crushing with re-cycling as defined herein above so as to give this oversize a particle size distribution having a diagram in the form of an inverted elongated S, and agglomeration is carried out separately under high pressure on the crushed oversize $A_1$ and fraction $A_2$ after having mixed with each of them the necessary proportions of porous reducing agent and water;

(c) if the materials to be agglomerated are excessively acid or basic, before proceeding with compression of the mixture or mixtures the excess acidity or basicity of this mixture or mixtures is corrected by an addition of approximately 1 to 3% of lime or acid;

(d) after compression, the hardening of the products compressed under high pressure is accelerated by placing them in an atmosphere of air or flue gases whose temperature is between about 0 and 100° C.

The adjustment of the crushing rate of the crushers, in order to obtain in the crushed material a particle size distribution diagram resembling an inverted elongated S curve, should be made experimentally because the relative proportions of the fine, medium and large particles in the crushed product depend to a great extent on the particle size distribution of the material before grinding, and also on the relative hardnesses of the different particles forming said materials. However it may be said that, in most cases, for increasing the proportion of the fine particles and simultaneously decreasing the proportion of the large particles in the crushed product, the crushers will be adjusted to run with a crushing rate near the upper limit of 60 to 80% specified, while, for decreasing the proportion of the fine particles and simultaneously increasing the proportion of the large particles, the crushing rate of the crushers shall be nearer to the lower limit of 25 to 30%.

Without the invention being in any way limited by the following, it is thought that the surprising effect achieved by the invention, namely the production of compressed products which resist mechanical and thermal stresses, and which can easily be reduced and smelted in a shaft furnace without returning to the dust state, can be explained as follows:

By giving the pulverulent metalliferous materials and also the fuel associated therewith a particle size distribution wherein the fine, medium and large particles form respectively from 29 to 42%, 13 to 19% and 39 to 58% of the total weight of the mixture in the dry state and by subjecting this mixture to very high pressures of 250, 500 or 1000 kg. per cm.$^2$, compressed products are obtained which have extraordinary compactness, enabling them to resist perfectly well, without cracking, spalling or considerable abrasion, severe weather conditions during storage, handling, falls, and stresses to which they are subjected when they descend through the shaft furnace.

As the compressed products are heated from their periphery inwards in the shaft furnace, the solid fuel enters in reaction with the oxygenated components contained in said products or with the gas ascending through the furnace and is volatilised progressively also from the periphery inwards. The compressed products are thus transformed gradually, into very porous bodies where and when it is necessary, thus enabling the gases to escape easily at the exact moment of their formation. Samples taken from various levels in the shaft furnace also seem to confirm the validity of this explanation, since compressed products perfectly reduced in totality have been observed opposite the mouth of the tuyeres without any modification of their shape, said products having a fairly high porosity owing to the gradual volatilisation of the reducing agent.

This novel agglomeration process can advantageously be combined with a sintering process known per se, which makes it possible to increase in an important manner the output of the sintering plant, e.g. by 100% or more, without increasing in similar proportions the initial expenses of said plant.

For this purpose, the materials to be agglomerated are distributed into two groups A and B, group A containing the raw metalliferous materials, that is to say the materials whose hydrates, carbonates or oxides have not yet been subjected to any decomposition or reduction, and group B containing the already fired metalliferous materials that is to say materials whose hydrates, carbonates or oxides have already undergone partial or total reduction or decomposition by heating. The materials of group A are subjected to a dust-removing operation on a screen whose mesh size ranges between 1 and 5 mm., so as to obtain a dust-free product $A_1$ and fine dusts $A_2$ which pass through the selected screen. The products $A_2$ and B are mixed, and this mixture is given a particle size distribution whose diagram is a curve resembling an inverted elongated S, by subjecting it to the operations of screening and progressive controlled crushing with recycling as herein above defined. There is added to this mixture 2 to 12% of a solid reducing agent finely crushed by the same method, the mixture obtained has added thereto the necessary quantity of water to bring its moistness to a value of between 7 and 16%. The moistened mixture is compressed under high pressure of at least 250 kg. per cm.$^2$, and the product $A_1$ only is subjected to the known sintering process. After sintering the product $A_1$ is passed over a screen having a mesh size of about 5 to 10 mm., and the screenings from this operation are incorporated in the materials of group B to be processed later.

This combined sintering-agglomerating process which avoids returning to the sintering process the materials coming therefrom, and which consequently considerably increases the output of this operation, can be carried into effect in various ways, among which the following is particularly advantageous:

(a) The dust-free raw product $A_1$ is sintered by admixture with a solid fuel whose particles having a diameter greater than a predetermined value ranging between 3 and 7 mm., the fuel is prepared by its being subjected to progressive, controlled crushing with recycling on a control screen which has a mesh size between 3 and 7 mm., so as to reduce the size of all the particles of said fuel below said predetermined value.

(b) The fuel prepared as specified under (a) is subjected to a dust-removal operation on a screen whose mesh size is between about 0.5 and 3 mm., the oversize from this dust-removing operation is used for the sintering of the raw product $A_1$ and the fine fraction coming from this dust-removing operation is used as the solid reducing agent to be added to the mixture $A_2+B$ before its agglomeration under high pressure.

It has been found that a mixed agglomeration plant according to the invention makes it possible to lower the average working expenses by about 70%, since in a plant of this kind only the dust-freed pulverulent materials which are easily sinterable are to be heated, for sintering by a heat treatment at about 1000°, whereas all the other pulverulent metalliferous materials are agglomerated in the cold state by simple compression.

A better understanding of my invention will appear from the following description with reference to the accompanying diagrammatic drawings wherein:

FIGURE 1 is a diagram showing how the particle size distribution of a raw pulverulent material may be modified by the controlled progressive crushing method with recycling used in this invention, to obtain a particle size distribution whose representative curve is an inverted elongated S.

FIGURE 2 is a diagrammatic showing of a plant for agglomerating in the cold state under very high pressure, by the process of this invention, raw metalliferous pulverulent materials and the necessary reducing agent.

FIGURE 3 is a diagrammatic showing of a plant in which the pulverulent products to be agglomerated comprise very fine products such as blast furnace or converter dusts, having a total particle size range lower than about 1 mm.

Figure 4:
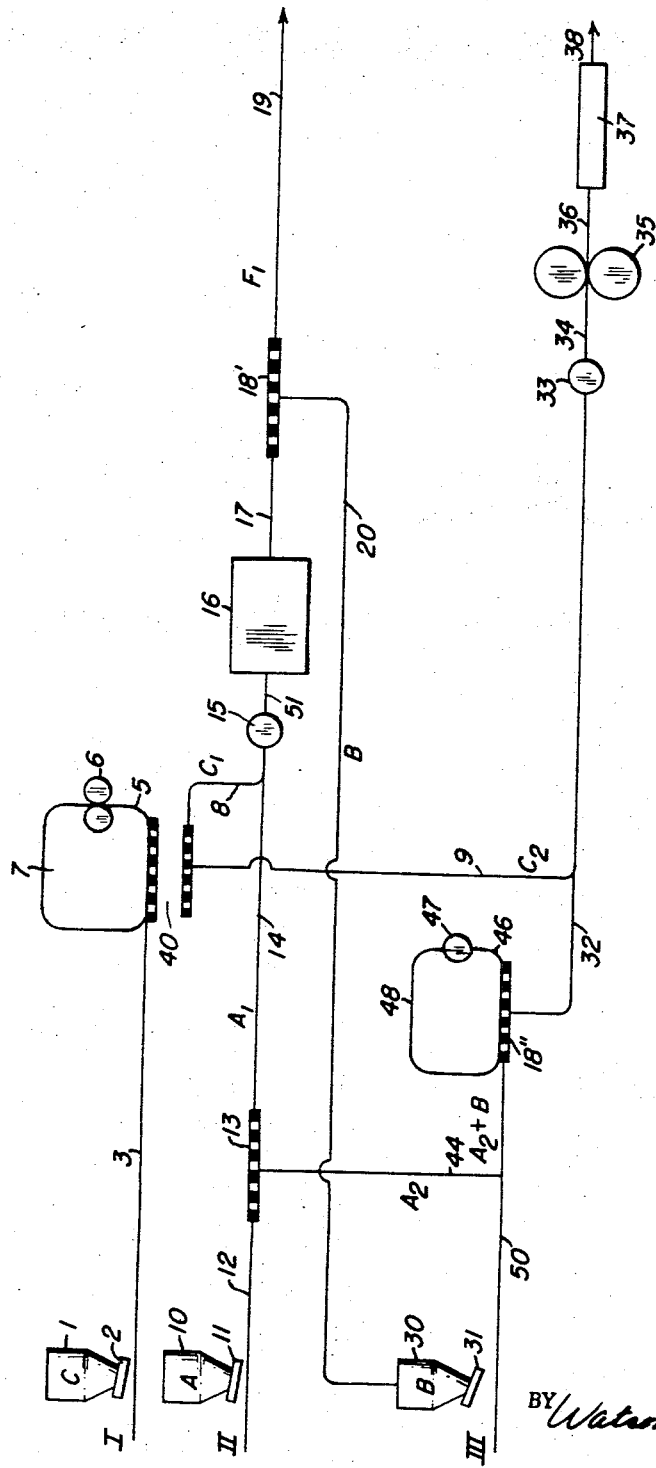

FIGURE 4 is a diagrammatic showing of a plant in which only one portion of the raw metalliferous pulverulent materials, namely that which is difficult to sinter, is subjected to agglomeration by compression together with the return fines coming from an associated sintering plant, shown in block form 16, whilst the other portion of these pulverulent materials, namely that which is easily sinterable is subjected to agglomeration by sintering.

Referring now to the drawings and more particularly to FIG. 1, the curve M shows the particle size distribution diagram of a raw pulverulent material consisting of the undersize obtained through a screening operation on a mesh size of 12 mm., said diagram having the common parabolic aspect. Assuming that the material has to be reduced in size under 5 mm., if said material was ground directly by passing it through a grinder capable of lowering the particle size of 95 to 100% by weight of said material below 5 mm. in one grinding operation (crushing rate of 95–100%) as is the common practice, the size distribution diagram obtained would be similar to the curve C showing a very high proportion of fine particles. The same general aspect would be obtained for said diagram, if the raw material was first screened on a mesh of 5 mm. and if the oversize only was ground below 5 mm. in one operation; the diagram of the product obtained by mixing the undersize fraction of the screening operation with the ground oversize fraction being then slightly flattened but having always the parabolic aspect of the curve C.

With the method used in this invention for modifying the particle size distribution of a pulverulent material in order to obtain a product having a high packing density capable of giving, upon compression in the wet state, agglomerates having a high mechanical strength, the pulverulent material is first of all subjected to a first screening operation on a control mesh size chosen so as to obtain as oversize the portion of said material consisting of the particles having a size greater than that desired as upper limit in the final product. In this manner the particles of the raw materials having the desired fineness are protected from any further grinding action. The oversize fraction thus obtained is then progressively ground by passing through a grinder or crusher of any suitable type, running at a low crushing rate as defined herein above. The product issuing from the grinder is screened on said control mesh, the undersize fraction thus obtained is added to the first undersize fraction, and the oversize is recycled to the grinder as many times as necessary for giving to all its particles the fineness just necessary for passing through the control screen. In this manner the progressively ground product is formed of a very high proportion of large particles and includes only a small proportion of fine particles and a very low proportion of medium particles.

In FIGURE 1 of the drawings, the particle size distribution of the oversize fraction obtained in the first screening operation is represented by the portion of the curve M extending from the point A to the point B. By the above described progressive grinding operation with recycling, said fraction takes a particle size distribution whose diagram is represented by the curve D having a very low slanting middle portion merging with two much more slanting side portions respectively GH and JK. The final ground product consisting of the first undersize fraction (represented by the portion OA of the curve M) mixed with the thus ground oversize fraction (represented by the curve D) has a particle size distribution represented by the curve F obtained by adding the ordinates of the curves OA and D. As shown said diagram has somewhat the aspect of an inverted elongated S, showing a noticeable concavity directed upwards in contradistinction to the curve C having a concavity directed downwards.

It is obvious that by adjusting the crushing rate of the grinder and by modifying the mesh of the control screen, it is possible to modify at will the aspect of the curve D and consequently of the curve F, according to the aspect of the curve M, the hardness of the materials dealt with, and the desired upper limit for the particles in the final ground product. In FIGURE 1 it has been supposed that the raw product M was to be ground below a particle size of 5 mm. so that the total particle size distribution range of 5 mm. is subdivided in three portions each extending over one third of 5 mm., the fine particles ranging up to 1.66 mm., the medium particles ranging between 1.66 and 3.33 mm. and the large particles ranging between 3.33 and 5 mm. It is seen in this figure that the ground mixture (curve F) consists of about 36.5% of fine particles, of about 14.5% of medium particles, and of about 49% of large particles.

In practice, for obtaining a mixture of metalliferous product and solid reducing agent capable of giving by compression in the cold state under high pressure, agglomerates having a particularly high strength and a high resistance to abrasion and to heat in a shaft furnace, and further capable of acquiring a good porosity during their descent through the shaft furnace, it is convenient to give to the solid reducing agent a particle size range somewhat lower than the particle size range of the metalliferous product, and preferably to give to said reducing agent a particle size not greater than 2 mm. in order that the pores appearing in the agglomerates by virtue of the gasification of said reducing agent should not be too large. As generally the upper limit for the particles of the metalliferous material should be somewhat higher than 2 mm., care should be made in adjusting the crushing rate of the crushers to have a sufficiently high proportion of large particles in the ground metalliferous material for taking into account the desired proportion of the more finely ground reducing agent in the final mixture.

As already said above, the best results are obtained when the proportions in the final mixture (metalliferous materials+reducing agent) of the fractions consisting of fine, medium and large particles are respectively within the following ranges, 29–42% by weight for the former, 13–19% and 39–58% by weight for the two others. These percentages, when plotted provide the particle size distribution diagrams which may be considered as the limit diagrams for the process of this invention. Said limit diagrams are shown in FIGURE 1. Curves P and Q drawn in dash and dotted lines illustrate the limits for particles of 5 mm. maximum. In practice the particle size distribution diagram of the mixture should be a curve resembling an elongated inverted S entirely located within the area surrounded by said curves P and Q.

In the embodiment shown on FIGURE 2, the agglomeration plant comprises two treatment lines:
line I for the preparation of the solid reducing agent C, for example coke or coal,
line II for the preparation of metalliferous pulverulent materials A.

On the line I, the fuel C is processed by "controlled progressive crushing with re-cycling" to obtain a crushed product having a constant particle size distribution, as defined herein above, of up to about 2 mm. whose diagram is an elongated inverted S. For this purpose, the fuel C is extracted from the bin 1 by a metering apparatus 2 and conveyed by the conveyor 3 to the screen 4 whose mesh size is 2 mm. The oversize from this screening operation is carried by the conveyor 5 to a crusher 6, whose rollers spacing is adjustable so as to permit the adjustment of its crushing rate between 25 and 80%, and the product of this crushing operation is re-cycled by the conveyor 7 to the screen 4. The screenings from the screening operation are sent to the conveyor 32 by the conveyor 9.

On the line II, the metalliferous pulverulent materials A are also processed by "progressive controlled crushing with re-cycling" to obtain a product having a constant particle size distribution of up to 3 mm., for example whose diagram is represented by an inverted elongated S curve. For this purpose, said materials are extracted from the bin 10 by means of a metering apparatus 11 and conveyed by the conveyor 12 to the screen 13 equipped with meshes of 3 mm. The oversize $A_1$ of the screen 13 is sent by the conveyor 41 to the crusher 42 which can be of the percussion type and whose speed is adjustable to give to said crusher a crushing rate lower than 80% so as to submit the oversize $A_1$ to a very gentle crushing operation. The product of this crushing operation is re-cycled by the conveyor 43 to the screen 13. The screenings $A_2$ passing through the screen 13 are sent by the conveyor 44 to the conveyor 32.

The products treated on line I and line II are collected on the conveyor 32 which brings them to the mixer 33. In this apparatus 33, the necessary quantity of water is added to obtain a mass whose moisture content is between 7 and 16%. If necessary, acidity or basicity of this mass is corrected by an addition of about 1 to 3% of lime or acid. The product issuing from the mixer 33 is sent by the conveyor 34 into a rolling press 35 operating with a compressive stress greater than 250 kg./cm.$^2$ and which delivers compressed ovoids O of between 20 and 40 cm.$^3$ in size. These compressed products O are taken by the conveyor 36 to a hardening accelerator 37 constituted by a grid-like band below which air or flue gases are blown at a temperature lower than 100° C. The conveyor 38 discharges towards the shaft furnace or storage depot the compressed products O issuing from this hardening accelerator.

If, amongst the metalliferous materials to be agglomerated there are used very fine products such as converter or blast furnace dusts whose upper particle size limit is lower than the separation mesh size of the screen 13, it is advantageous to use the arrangement shown in FIGURE 3 in which these materials are stored in a bin 30 arranged on the line II parallel to the two preceding lines. In this case, the dusts P are extracted from the bin 30 by the metering apparatus 31 and they are conveyed by the conveyor 50 to the conveyor 32 which conveys them to the mixer 33.

FIGURE 4 which shows by way of example another means of carrying the process into effect, differs from FIGURE 3 only in the following points:

In line I, the single-stage screen 4 of FIGURES 2 and 3 is substituted by the two-stage screen 40 having meshes of different sizes, the upper stage being equipped with a mesh size of 4 mm. for example and the lower stage with a mesh size of 1 mm. for example.

On line II the crusher 42 and the conveyors 41 and 43 of FIGURES 2 and 3 are omitted and in place thereof are provided the mixer 15, the sintering plant 16, the single stage screen 18' and the conveyors 17, 19 and 20.

In line III is provided a single screen 18" associated with a crusher 47 and conveyors 46 and 48 forming together a controlled progressive crushed circuit with re-cycling of the oversize, similar to the circuit comprising screen 13, crusher 42 and conveyors 41 and 43 in the FIGURES 2 and 3. Screen 18" is equipped with a mesh of 3 mm. and is mounted in line III between conveyor 44 carrying the undersize $A_2$ from screen in line 2, and conveyor 9 carrying the lower fraction $C_2$ of fuel issuing from screen 40".

Thus, on the line I, the fuel C is processed by "controlled progressive crushing with re-cycling" so as to obtain a crushed product having a constant total particle size distribution, of up to 4 mm. for example, and the product of this crushing operation is freed from dust on a screen having a mesh size of about 1 mm. so as to obtain a product $C_1$ having a constant particle size distribution of from 1–4 mm., which is used for sintering of the materials $A_1$, and a product $C_2$ whose particle size distribution is up to 1 mm. and is used for briquetting, by cold compression, the materials $A_2$ and B (fine metalliferous products P and returned fines $F_2$). In fact, the oversize from the upper stage of the screen 40 formed of particles in excess of 4 mm. is conveyed by the conveyor 5 into the crusher 6 and the product of this crushing operation is recycled by the conveyor 7 to the upper stage of the screen 40. The oversize $C_1$ from the lower stage of the screen 40 is conveyed by the conveyor 8 to the treatment line II and the screenings $C_2$ from this stage are sent by the conveyor 9 to the treatment line III.

On the line II, the metalliferous pulverulent material A is freed of dust so as to obtain a dust-free product $A_1$ which is sent to the sintering plant 16 with the dust-free fuel $C_1$. For this purpose, the pulverulent material A is taken from the bin 10 by means of the metering apparatus 11 and is conveyed by the conveyor 12 to the screen 13 having a mesh size of 3 mm. for example. The screenings $A_2$ from this screen are sent by the conveyor 44 to the line III. The oversize $A_1$ of the screen 13 is sent by the conveyor 14 to the mixer 15 fed simultaneously with the fuel $C_1$ through the conveyor 8. The mixture issuing from mixer 15 is conveyed to the sintering plant 16 by the conveyor 51. The product of the sintering operation is conveyed by the conveyor 17 to screen 18' having a mesh size of 7 mm. The oversize from screen 18' is sent to the blast furnace by the conveyor 19. The undersize fraction is sent by conveyor 20 to bin 30. On line III the materials of group B (return fines $F_2$ and fine-dusts P) stored in bin 30 are extracted by metering apparatus 31 and conveyed by conveyor 50, together with product $A_2$, to screen 18" equipped with a mesh of 3 mm. The oversize fraction of the screen is sent by conveyor 46 into crusher 47 running at a low crushing rate (lower than 80%) to be subjected to a progressive controlled crushing operation and the crushed material is re-cycled by the conveyor 48 to the screen 18" and the screenings sent to mixer 33 by the conveyor 32.

On the line III are collected the dust taken from the line I, and the crushed mixture $A_2+B$ from screen 18". These materials are subjected to agglomeration by the cold compression operation under high pressure. For this purpose, the materials of group B are taken from the bin 30 by means of a metering apparatus 31 which sends them by conveyor 50 to screen 18". Conveyor 32 collects the products $A_2+B$ coming from screen 18", and the fuel $C_2$ coming from the dust removing operation in line I, and sends all these products to the mixer 33. In this apparatus the necessary quantity of water for obtaining a mass having a moisture content of between 7 and 16% is added. If necessary the acidity or basicity of this mass is corrected by the addition of about 1 to 3% of lime or acid. The product issuing from the mixer 33 is sent by the conveyor 34 to a rolling press 35 capable of compressing the thus prepared mixture at a pressure of at least 250 kg./cm.$^2$ and much more and delivering compressed ovoids O having a relatively low volume comprised between about 20 and about 40 cm.$^3$. These compressed products O are sent by the conveyor 36 into a hardening accelerator 37 constituted by a grid-like band under which is blown air or flue gases at a temperature lower than 100° C. The conveyor 38 delivers towards the blast furnace the compressed products O which issue from this hardening accelerator.

While I have herein described specific examples of carrying into effect the process of my invention, particularly when applied in connection with a sintering process for eliminating the difficulties arising when fine materials coming from the sintering plant are returned to the sintering process, it is to be understood that the invention is not limited to said examples which have been described for the sake of disclosure, but contemplates all such variants and modifications thereof falling within the scope of the appended claims.

What I claim is:

1. A process for agglomerating metalliferous pulverulent materials for obtaining compact briquettes in the cold state, without the aid of binding agents, said briquettes acquiring a porosity during their descent through a shaft furnace which will enable their full and easy reduction during smelting, comprising the steps of subjecting said materials to a crushing cycle associated with screening operations wherein said materials are fed to a screening zone equipped with a first control screen having a mesh size of up to 5 mm. for separating an oversize fraction, passing said oversize fraction through a crushing zone operating at a low crushing rate whereby in any given crushing cycle only a fraction of 25 to 80 percent by weight of said total oversize fraction acquires a fineness sufficient to pass through said control screen, recycling the product issuing from the crushing zone to the control screening zone for separating the undersize fraction thereof and recycling the oversize fraction to the crushing zone as often as is necessary to reduce the oversize fraction to a crushed product having a particle size controlled by said control screen and a constant particle size distribution; subjecting a solid carbonaceous reducing agent to a crushing cycle associated with screening operations in a manner similar to the above recited but using a second control screen having a mesh size of up to 3 mm. for obtaining a crushed reducing agent having a particle size controlled by said second control screen which is lower than the particle size of said crushed product and having a constant particle size distribution; adding to said crushed product from 2% to 12% by weight of said crushed reducing agent, said mesh sizes being selected and said crushing rates being selectively adjusted relatively to each other, to obtain fractions in the total mixture of the crushed product and crushed reducing agent having from 29% to 42% by weight of fine particles, from 13–19% by weight of medium particles and from 58–39% by weight of large particles, said fine, medium and large particles being relative to one another and each fraction constituting ⅓ of the total range of particle sizes in said mixture, adding to said mixture the necessary quantity of water for adjusting its moisture content between 7 and 16% by weight, and compressing said moist mixture at a pressure of at least 250 kg./cm.$^2$ into briquettes having a volume lower than about 40 cc.

2. A process for agglomerating metalliferous pulverulent materials comprising an admixture of a raw metalliferous material comprising ores containing a member of the group consisting of oxides, hydrates, carbonates and mixtures thereof, and fine particles having already been fired, comprising the steps of separating the materials to be agglomerated into two groups A and B, the group A containing the raw metalliferous material, the group B containing the particles having already been fired, feeding the materials of group A to a first control screen having a mesh size of up to 5 mm. to obtain an oversize fraction $A_1$ and an undersize fraction $A_2$; mixing the undersize fraction $A_2$ with the materials of group B; feeding the mixture $A_2+B$ to a crushing cycle associated with screening operations wherein said mixture is fed to a screening zone equipped with a first control screen having a mesh size of up to 5 mm. for separating an oversize fraction, passing said oversize fraction through a crushing zone operating at a low crushing rate in order that in a given crushing cycle, only a portion lower than 80 percent by weight of said oversize fraction acquires a fineness sufficient to pass through the first control screen, recycling the product issuing from the crushing zone to the control screening zone for separating the particles larger than the mesh of said control screen and recycling said particles to the crushing zone as often as is necessary to reduce said oversize fraction to a crushed product having a particle size controlled by said control screen and a constant particle size distribution; feeding a solid carbonaceous reducing agent to a crushing cycle, associated with screening operations, in a manner similar to the above recited but using a second control screen having a mesh size of up to 3 mm. for obtaining a crushed reducing agent having a particle size controlled by said second control screen and a constant particle size distribution; adding to said crushed product $A_2+B$ from 2 to 12% by weight of said crushed reducing agent; said mesh sizes being selected and said crushing rates being selectively adjusted relatively to each other, to obtain fractions in the total mixture of the crushed product and crushed reducing agent having from 29% to 42% by weight of fine particles, from 13–19% by weight of medium particles and from 58–39% by weight of large particles, said fine, medium and large particles being relative to one another and each fraction constituting ⅓ of the total range of particle sizes in said mixture, adding to said mixture of crushed metalliferous product and reducing agent the necessary quantity of water to bring its moisture content between 7 and 16% by weight; compressing said moist mixture at a pressure of at least 250 kg./cm.² into briquettes having a volume lower than 40 cc. approximately; subjecting the oversize fraction $A_1$ to a sintering operation to obtain a sintered product, passing said sintered product through a screening zone equipped with a mesh ranging between 5 and 10 mm., and adding the undersized portion of the screenings from said last named screening zone to the materials of group B for later agglomeration.

3. A process for agglomerating metalliferous pulverulent materials for obtaining compact briquettes in the cold state, without the aid of binding agents, said briquettes acquiring a porosity during their descent through a shaft furnace which will enable their full and easy reduction during smelting, comprising the steps of subjecting said materials to a crushing cycle associated with screening operations wherein said materials are fed to a screening zone equipped with a first control screen having a mesh of up to 5 mm. for separating an oversize fraction, passing said oversize fraction through a crushing zone operating at a low crushing rate such that in a given crushing cycle only a fraction of 30 to 60 percent by weight of said total oversize fraction acquires a fineness sufficient to pass through the first control screen recycling the product issuing from the crushing zone to the control screening zone for separating the undersize fraction and recycling the oversize fraction to the crushing zone as often as is necessary to reduce all the oversize fraction to a crushed product having a particle size controlled by said first control screen and a constant particle size distribution; subjecting a solid carbonaceous reducing agent to a crushing cycle, associated with screening operations, in a manner similar to the above recited but using a second control screen having a mesh size of up to 3 mm. for obtaining a crushed reducing agent having a particle size controlled by second control screen which is lower than the particle size of said crushed product and having a constant particle size distribution; adding to said crushed product from 2% to 12% by weight of said crushed reducing agent; said mesh sizes being selected and said crushing rates being selectively adjusted relatively to each other, to obtain fractions in the total mixture of the crushed product and crushed reducing agent having from 29% to 42% by weight of fine particles, from 13–19% by weight of medium particles and from 58–39% by weight of large particles, said fine, medium and large particles being relative to one another and each fraction constituting ⅓ of the total range of particle sizes in said mixture, adding to said mixture the necessary quantity of water for adjusting its moisture content between 7% and 16% by weight; compressing said moist mixture at a pressure of at least 250 kg./cm.² into briquettes having a volume lower than about 40 cc.; and subjecting said briquettes to a gaseous atmosphere composed of one material selected from the group consisting of air and flue gas at a temperature between 0° and 100° C. for hardening said compressed briquettes.

4. A process as claimed in claim 1 applied to metalliferous materials having a general acid character, wherein from 1 to 3% by weight of a basic mineral component is added to the mixture of crushed product and crushed reducing agent before proceeding to the compression of said mixture.

5. The process of claim 1, wherein said solid reducing agent is metallurgic coke.

6. The process of claim 1 applied to metalliferous materials having a general basic character, wherein from 1 to 3% by weight of a strong mineral acid is added to the mixture of crushed product and crushed reducing agent before proceeding to the compression of said mixture.

7. The product of the process of claim 1.

References Cited by the Examiner
UNITED STATES PATENTS

| | | | |
|---|---|---|---|
| 1,002,453 | 9/11 | Ronay | 75—3 |
| 1,168,401 | 1/16 | Kippe | 75—3 |
| 1,205,944 | 11/16 | Giesecke | 75—5 |
| 2,072,063 | 2/37 | Alton. | |
| 2,343,270 | 3/44 | Agnew | 75—5 |
| 2,684,897 | 7/54 | Diettrich | 75—3 X |

OTHER REFERENCES

Jones: Principles of Powder Metallurgy, Edward Arnold & Co., London, 1944, pp. 17–27.

Goetzel: Treatise on Powder Metallurgy, vol. I, interscience Publishers, Inc., New York, 1949, pp. 86–92, 100–107.

BENJAMIN HENKIN, *Primary Examiner.*

MARCUS U. LYONS, *Examiner.*